United States Patent
Samuelson

[19]

[11] Patent Number: 5,918,921
[45] Date of Patent: Jul. 6, 1999

[54] LEVERED SHOVEL FOR MOVING SNOW

[76] Inventor: Vernon Samuelson, 19984 Ravenda Dr., Lawrenceburg, Ind. 47025-8844

[21] Appl. No.: 09/030,531

[22] Filed: Feb. 24, 1998

[51] Int. Cl.$^6$ .................. A01B 1/22; E01H 5/02
[52] U.S. Cl. .............. 294/54.5; 37/285; 294/57; 294/59
[58] Field of Search ............... 294/49, 51, 54.5, 294/57–59; 16/110 R, 111 R, 114 R; 37/265, 278, 284, 285, 434, 270; 254/131.5

[56] References Cited

U.S. PATENT DOCUMENTS

| | | | |
|---|---|---|---|
| 2,470,217 | 5/1949 | McLoughlin | 294/54.5 X |
| 2,520,606 | 8/1950 | McLoughlin | 294/54.5 X |
| 2,846,785 | 8/1958 | Underwood | 294/54.5 X |
| 2,852,872 | 9/1958 | Benz | 294/59 X |
| 2,977,130 | 3/1961 | Jordan | 294/54.5 X |
| 3,023,021 | 2/1962 | Fricke et al. | 294/54.5 X |
| 3,136,574 | 6/1964 | Pasquale | 294/54.5 |
| 4,224,751 | 9/1980 | Schoemann et al. | 37/53 |
| 4,231,604 | 11/1980 | Obergfell | 294/59 |
| 4,690,447 | 9/1987 | Adams | 294/57 |
| 4,865,373 | 9/1989 | Hudson | 294/54.5 |
| 4,944,541 | 7/1990 | Waldschmidt | 294/54.5 X |
| 5,054,278 | 10/1991 | Thorndike | 294/59 X |
| 5,074,064 | 12/1991 | Nickels | 37/265 |
| 5,133,582 | 7/1992 | Rocha | 294/58 |
| 5,499,852 | 3/1996 | Seigendall | 294/58 |

FOREIGN PATENT DOCUMENTS

| | | | |
|---|---|---|---|
| 124872 | 7/1947 | Australia | 294/59 |

*Primary Examiner*—Johnny D. Cherry
*Attorney, Agent, or Firm*—Richard L. Miller, P.E

[57] ABSTRACT

A levered shovel for moving snow that includes a blade for carrying the snow, a shaft that extends from the blade, a wheel assembly for contacting a horizontal surface and which depends from the shaft, and a handle assembly for gripping by the user and which is disposed on the rearmost end of the shaft. The wheel assembly comprises either an axle fork, an axle rotatively mounted to the axle fork, and a pair of wheels attached to the axle or an inverted T-shaped member with its transverse portion serving as its axle to which a pair of wheel are rotatively attached. The handle assembly comprises a lower transverse member for gripping by the hands of the user and extends laterally from both sides of the rearmost end of the shaft and an extender for elevating the point at which the user grips the handle assembly for users with limited bending posture.

5 Claims, 1 Drawing Sheet

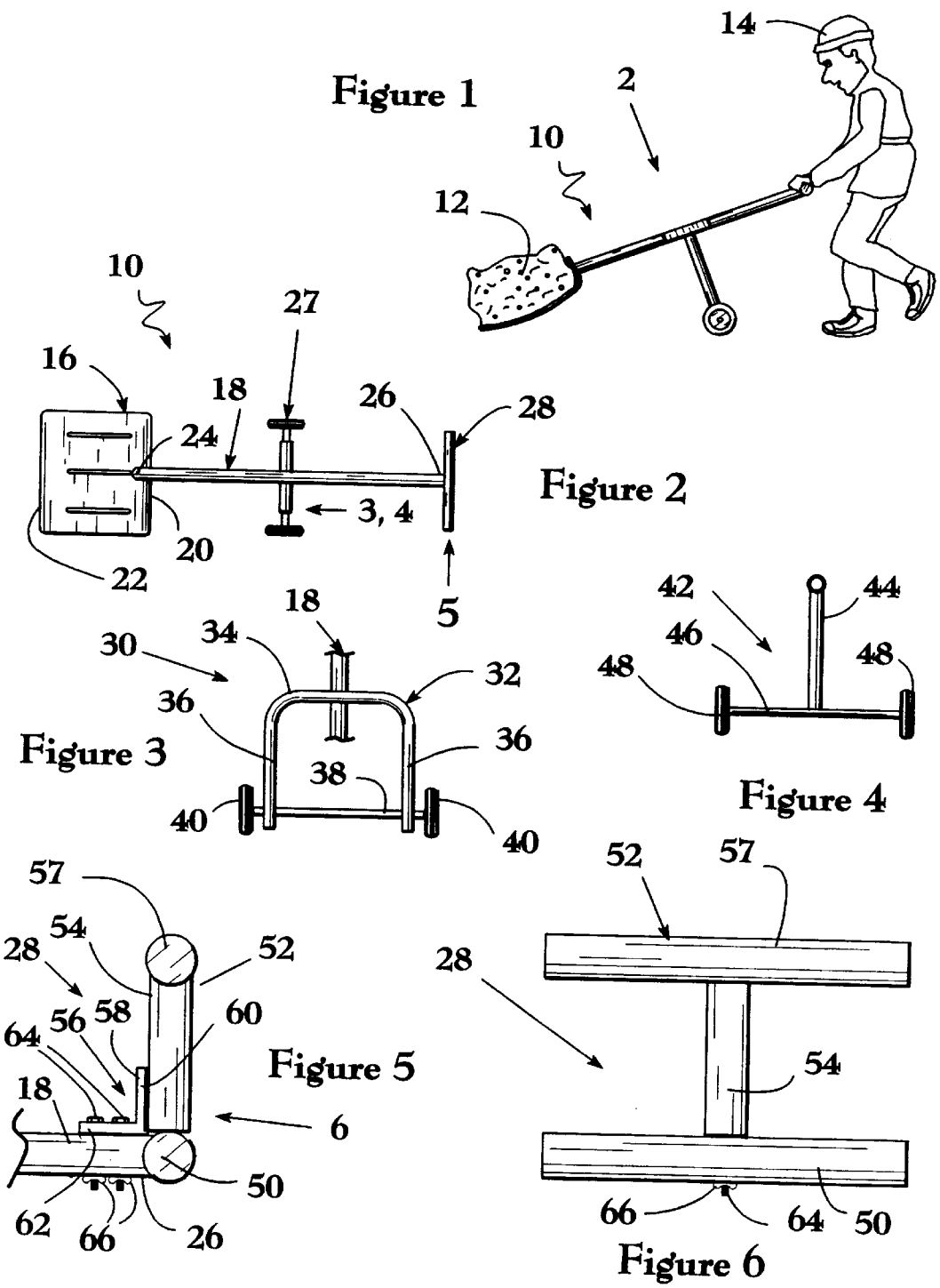

LEVERED SHOVEL FOR MOVING SNOW

BACKGROUND OF THE INVENTION

1. Field of the Invention

The present invention relates to a shovel. More particularly, the present invention relates to a levered shovel for moving snow.

2. Description of the Prior Art

Numerous innovations for shovels have been provided in the prior art that will be described. Even though these innovations may be suitable for the specific individual purposes to which they address, however, they differ from the present invention.

FOR EXAMPLE, U.S. Pat. No. 4,224,751 to Schoemann et al. teaches a device for snow removal comprising a frame, a flexible scoop, and means for flexing and relaxing the scoop.

ANOTHER EXAMPLE, U.S. Pat. No. 4,231,604 to Obergfell teaches a shovel having a blade and an elongated handle provided between the ends thereof, with a laterally extending enlargement. A resilient pad and cover are placed over and supported by the enlargement and handle. The supported pad acts as a fulcrum when placed on the user's thigh just above the Knee. The loaded blade may then be raised by lowering the free handle end with one hand and when the blade is in a sufficiently raised position, the handle may be grasped with the other hand near the blade for carrying or discharging the load from the blade.

STILL ANOTHER EXAMPLE, U.S. Pat. No. 4,865,373 to Hudson teaches a manually-operated snow shovel that has wheels in front of and behind the blade, to position the blade at an angle between 30 degrees and 35 degrees with the horizontal. An angularly bent handle positions grips at about waist height, to permit a person to roll the shovel on the surface being cleaned.

YET ANOTHER EXAMPLE, U.S. Pat. No. 5,074,064 to Nickels teaches a snow shovel that includes a forwardly opening hood supported on front and rear wheels for movement into a layer of snow on the ground surface. The bottom wall of the shovel is formed by a snow ejection plate that is swingably mounted for movement in a vertical arc from a prone position to an upright position. Snow deposited on the upper face of the plate is forcibly ejected from the shovel when the plate is swung to its upright position.

FINALLY, STILL YET ANOTHER EXAMPLE, U.S. Pat. No. 5,499,852 to Seigendall teaches a second handle attachment for a tool having a handle shaet, such as a shovel. The second handle attachment provides a grip portion that a user may grab so that the shovel may be used without the user bending over. In this manner, back injury and strain is reduced. The second handle attachment provides two clamshell brackets which are bolted into a rigid relationship with the tool's handle shaft. The attachment also provides a rotating second handle that may be locked into place at any of several angular relationships with the tool handle shaft. The second handle provides a grip portion that is typically covered by a plastic or rubber grip cover. The second handle attachment may be transferred among any type of shovel, rake, snow shovel, hoe or pitch fork. It may be adjusted up or down the handle shaft, to accommodate taller or shorter uses. It may be rotated to accommodate right-handed, left-handed or ambidextrous users. A bushing is provided so that the second handle attachment may be used with a light weight rake having a smaller diameter handle shaft, as well as a shovel having a larger diameter handle shaft.

It is apparent that numerous innovations for shovels have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a levered shovel for moving snow that avoids the disadvantages of the prior art.

ANOTHER OBJECT of the present invention is to provide a levered shovel for moving snow that is simple and inexpensive to manufacture.

STILL ANOTHER OBJECT of the present invention is to provide a levered shovel for moving snow that is simple to use.

BRIEFLY STATED, YET ANOTHER OBJECT of the present invention is to provide a levered shovel for moving snow that includes a blade for carrying the snow, a shaft that extends from the blade, a wheel assembly for contacting a horizontal surface and depends from the shaft, and a handle assembly for gripping by the user and is disposed on the rearmost end of the shaft. The wheel assembly comprises either an axle fork, an axle rotatively mounted to the axle fork, and a pair of wheels attached to the axle or an inverted T-shaped member with its transverse portion serving as its axle to which a pair of wheel are rotatively attached. The handle assembly comprises a lower transverse member for gripping by the hands of the user and extends laterally from both sides of the rearmost end of the shaft and an extender for elevating the point at which the user grips the handle assembly for users with limited bending posture.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic side elevational view of the present invention in use;

FIG. 2 is an enlarged diagrammatic top plan view taken generally in the direction of arrow 2 in FIG. 1;

FIG. 3 is an enlarged rear elevational view taken generally in the direction of arrow 3 in FIG. 2 of a first embodiment of the wheel assembly invention;

FIG. 4 is an enlarged rear elevational view taken generally in the direction of arrow 4 in FIG. 2 of a second embodiment of the wheel assembly;

FIG. 5 is an enlarged side elevational view taken generally in the direction of arrow 5 in FIG. 2 of a second embodiment of the handle assembly; and FIG. 6 is a diagrammatic rear elevational view taken generally in the direction of arrow 6 in FIG. 5.

LIST OF REFERENCE NUMERALS UTILIZED IN THE DRAWING 10 levered shovel for moving snow of the present invention 12 snow 14 user
16 blade for carrying snow 12
18 shaft
20 rearmost edge of blade 16
22 forwardmost edge of blade 16 for scooping snow 12
24 forwardmost end of shaft 18
26 rearmost end of shaft 18
27 wheel assembly for contacting a horizontal surface.
28 handle assembly For gripping by user 14
30 first embodiment of wheel assembly 27
32 axle fork of first embodiment 30 of wheel assembly 27
34 transverse portion of axle fork 32 of first embodiment 30 of wheel assembly 27
36 pair of legs of axle fork 32 of first embodiment 30 of wheel assembly 27
38 axle of first embodiment 30 of wheel assembly 27
40 pair of wheels of first embodiment 30 of wheel assembly 27
42 second embodiment of wheel assembly 27
44 upright member of second embodiment 42 of wheel assembly 27
46 axle of second embodiment 42 of wheel assembly 27
48 pair of wheels of second embodiment 42 of wheel assembly 27
50 lower transverse member of handle assembly 38 for gripping by hands of user 14
52 extender of handle assembly 38 for elevating point at which user 14 grips handle assembly 28 for users 14 with limited bending posture
54 upright member of extender 52 of handle assembly 38
56 attaching apparatus for replaceably attaching upright member 54 of extender 52 of handle assembly 38 to lower transverse member 50 of handle assembly 38
57 upper transverse member of extender 52 of handle assembly 38 for gripping by hands of user 14
58 L-bracket of attaching apparatus 56
60 upright portion of L-bracket 58 of attaching apparatus 56
62 transverse portion of L-bracket 58 of attaching apparatus 56
64 pair of bolts of attaching apparatus 56
66 pair of wing nuts of attaching apparatus 56 for selectively attaching extender 52 of handle assembly 38 to handle assembly 18

DETAILED DESCRIPTION OF THE PREFERRED EMBODIMENT

Referring now to the figures in which like numerals indicate like parts, and particularly to FIG. 1, the levered shovel for moving snow of the present invention is shown generally at 10 for moving snow 12 by a user 14.

The overall configuration of the levered shovel for moving snow 10 can best be seen in FIG. 2, and as such will be discussed with reference thereto.

The levered shovel for moving snow 10 comprises a blade 16 for carrying the snow 12 and a shaft 18 that extends from the blade 16.

The blade 16 is wide, thin, and substantially rectangular-shaped with a rearmost edge 20 that is upturned, and a forwardmost edge 22 for scooping the snow 12.

The shaft 18 is slender, elongated, and extends, at is forwardmost end 24, perpendicularly rearwardly from the rearmost edge 20 of the blade 16, at its midpoint, and terminates in a rearmost end 26.

The levered shovel for moving snow 10 further comprises a wheel assembly 27 for contacting a horizontal surface. The wheel assembly 27 depends from the shaft 18.

The levered shovel for moving snow 10 further comprises a handle assembly 28 for gripping by the user 14. The handle assembly 28 is disposed on the rearmost end 26 of the shaft 18.

The specific configuration of the wheel assembly 27 can best be seen in FIGS. 3 and 4, and as such will be discussed with reference thereto.

A first embodiment 30 of the wheel assembly 27 is shown in FIGS. 3, and comprises an axle fork 32 that is inverted U-shaped. The axle fork 32 of the first embodiment 30 of the wheel assembly 27 has a transverse portion 34 that extends, at its midpoint, perpendicularly laterally from both sides of the shaft 18, at a desired point along its lowermost surface, for movement therewith, with the point being determined by the height of the user 14 and the amount of leverage desired.

The axle fork 32 of the first embodiment 30 of the wheel assembly 27 further has a pair of legs 36 that are parallel and depend coplanarly and perpendicularly from the transverse portion 34 of the axle fork 32 of the first embodiment 30 of the wheel assembly 27, at its ends, for movement therewith.

The first embodiment 30 of the wheel assembly 27 further comprises an axle 38 that extends rotatively through the pair of legs 36 of the axle fork 32 of the first embodiment 30 of the wheel assembly 27, at their lower ends.

The first embodiment 30 of the wheel assembly 27 further comprises a pair of wheels 40 for rotative movement on the horizontal surface. The pair of wheels 40 of the first embodiment 30 of the wheel assembly 27 are attached to the axle 38 of the first embodiment 30 of the wheel assembly 27, at its ends, for rotation therewith, outward of the pair of legs 36 of the axle fork 32 of the first embodiment 30 of the wheel assembly 27.

A second embodiment 42 of the wheel assembly 27 is shown in FIG. 4, and comprises an upright member 44 chat is slender, elongated, and depends perpendicularly from a desired point on the shaft 18, at its lowermost surface, for movement therewith, with the point being determined by the height of the user 14 and the amount of leverage desired.

The second embodiment 42 of the wheel assembly 27 further comprises an axle 46 that extends, at its midpoint, perpendicularly laterally from both sides of the upright member 44 of the second embodiment 42 of the wheel assembly 27, at its lowermost end, for movement therewith.

The second embodiment 42 of the wheel assembly 27 further comprises a pair of wheels 48 for rotative movement on the horizontal surface. The pair of wheels 48 of the second embodiment 42 of the wheel assembly 27 are attached to the axle 48 of the second embodiment 42 of the wheel assembly 27, at its ends, for rotation relative thereto.

The specific configuration of the handle assembly 28 can best be seen in FIGS. 5 and 6, and as such will be discussed with reference thereto.

The handle assembly 28 comprises a lower transverse member 50 for gripping by the hands of the user 14. The lower transverse member 50 of the handle assembly 28 is elongated, slender, and extends, at its midpoint, laterally, perpendicularly, and coplanarly from both sides of the rearmost end 26 of the shaft for movement therewith.

The handle assembly 28 further comprises an extender 52 for elevating the point at which the user 14 grips the handle assembly 28 for users 14 with limited bending posture.

The extender 52 of the handle assembly 28 is T-shaped and comprises an upright member 54 that extends perpendicularly upwardly from, and is replaceably attached by attaching apparatus 56 to, the lower transverse member 50 of the handle assembly 28, at its midpoint, for movement therewith.

The extender 52 of the handle assembly 28 further comprises an upper transverse member 57 for gripping by the hands of the user 14. The upper transverse member 57 of the extender 52 of the handle assembly 28 is elongated, slender, and extends, at its midpoint, laterally, perpendicularly, and coplanarly from both sides of the upright member 54 of the extender 52 of the handle assembly 28, from its uppermost end, and is parallel to the lower transverse member 50 of the handle assembly 28.

The attaching apparatus 56 of the extender 52 of the handle assembly 28 comprises an L-bracket 58 that has an upright portion 60 that is fixedly attached to the upright member 54, at its lowermost end and forwardmost surface.

The L-bracket 58 of the attaching apparatus 56 of the extender 52 of the handle assembly 28 further comprises a transverse portion 62 that extends forwardly from the upright portion 60 of the L-bracket 58 of the attaching apparatus 56 of the extender 52 of the handle assembly 28, from its lowermost end, forwardly along the rearmost end 26 of the shaft 18.

The attaching apparatus 56 of the extender 52 of the handle assembly 28 further comprises a pair of bolts 64 that depend through the transverse portion 62 of the L-bracket 58 of the attaching apparatus 56 of the extender 52 of the handle assembly 28, through the rearmost end 26 of the shaft 18, and threadably engage a pair of wing nuts 66 for selectively attaching the extender 52 of the handle assembly 28 to the handle assembly 18.

It will be understood that each of the elements described above, or two or more together, may also find a useful application in other types of constructions differing from the types described above.

While the invention has been illustrated and described as embodied in a levered shovel for moving snow, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A levered shovel for moving snow, comprising:
a) a blade for carrying the snow; and
b) a shaft extending from said blade, wherein said blade is wide, thin, and substantially rectangular-shaped, with a rearmost edge thereof that is upturned, and a forwardmost edge thereof for scooping the snow, wherein said shaft is slender, elongated, and extends, at its forwardmost end, perpendicularly rearwardly from said rearmost edge of said blade, at its midpoint, and terminates in a rearmost end; further comprising a handle assembly for gripping by the user; said handle assembly disposed on said rearmost end of said shaft, wherein said handle assembly comprises a lower transverse member for gripping by the hands of the user; said lower transverse member of said handle assembly is elongated, slender, and extends, at its midpoint, laterally, perpendicularly, and coplanarly from both sides of said rearmost end of said shaft for movement therewith, wherein said handle assembly further comprises an extender for elevating the point at which the user grips said handle assembly for users with limited bending posture, wherein said extender of said handle assembly is T-shaped and comprises an upright member that extends perpendicularly upwardly from, and is replaceably attached by attaching apparatus to, said lower transverse member of said handle assembly, at its midpoint, for movement therewith.

2. The shovel as defined in claim 1, wherein said extender of said handle assembly further comprises an upper transverse member for gripping by the hands of the user; said upper transverse member of said extender of said handle assembly is elongated, slender, and extends, at its midpoint, laterally, perpendicularly, and coplanarly from both sides of said upright member of said extender of said handle assembly, from it uppermost end, and is parallel to said lower transverse member of said handle assembly.

3. The shovel as defined in claim 2, wherein said attaching apparatus of said extender of said handle assembly comprises an L-bracket that has an upright portion that is fixedly attached to said upright member of said extender of said handle assembly, at its lowermost end and forwardmost surface.

4. The shovel as defined in claim 3, wherein said L-bracket of said attaching apparatus of said extender of said handle assembly further comprises a transverse portion that extends forwardly from said upright portion of said L-bracket of said attaching apparatus of said extender of said handle assembly, from its lowermost end, forwardly along said rearmost end of said shaft.

5. The shovel as defined in claim 4, wherein said attaching apparatus of said extender of said handle assembly further comprises a pair of bolts that depend through said transverse portion of said L-bracket of said attaching apparatus of said extender of said handle assembly, through said rearmost end of said shaft, and threadably engage a pair of wing nuts for selectively attaching said extender of said handle assembly to said handle assembly.

* * * * *